Figure 1:
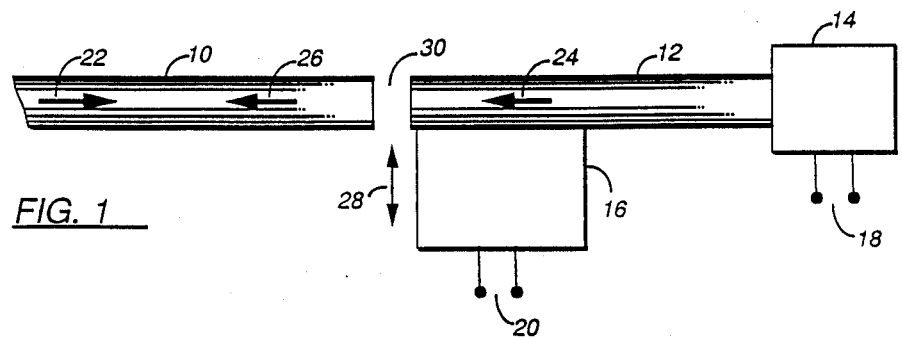

United States Patent [19]

Hughes et al.

[11] Patent Number: 4,950,887
[45] Date of Patent: Aug. 21, 1990

[54] OPTICAL FIBER INTERFACE

[75] Inventors: Richard P. Hughes, Kanata; Vincent C. So; Paul J. Vella, both of Ottawa, all of Canada

[73] Assignee: Northern Telecom Limited, Montreal, Canada

[21] Appl. No.: 426,659

[22] Filed: Oct. 26, 1989

[51] Int. Cl.$^5$ ............................................... H01J 5/16
[52] U.S. Cl. .................................. 250/227.21; 455/612
[58] Field of Search ........................ 250/227.21, 227.28; 455/610, 612; 330/4.3

[56] References Cited

U.S. PATENT DOCUMENTS

| | | | |
|---|---|---|---|
| 4,195,269 | 3/1980 | Ettenberg et al. | 340/4.3 |
| 4,709,413 | 11/1987 | Forrest et al. | 455/612 |
| 4,741,587 | 5/1988 | Jewell et al. | 455/612 |
| 4,815,805 | 3/1989 | Levinson et al. | 455/612 |

Primary Examiner—David C. Nelms
Attorney, Agent, or Firm—Dallas F. Smith

[57] ABSTRACT

An optical fiber interface includes a detector assembly, which may include an integral fiber, for detecting an optical signal carried on a single fiber in an outbound direction and a piezo electric transducer or the like for providing relative movement between the fiber and the detector assembly to produce a modulated return optical signal in reflections of the outbound signal. The return optical signal has a lower frequency or data rate than the outbound signal. Several embodiments modulate the return signal by relative movement either perpendicular to or parallel to the fiber. The perpendicular movement modulates the reflected signal by varying alignment of the fiber and detector assembly, while the parallel movement modulates by varying a Fabry-Perot gap formed between the fiber and the detector assembly. One embodiment includes a cantilever beam of semiconductor material attached to the detector surface. The beam providing an integrated transducer and reflecting surface.

21 Claims, 1 Drawing Sheet

OPTICAL FIBER INTERFACE

This invention relates to an optical fiber interface, and is particularly concerned with such interfaces for converting between electrical signals and optical signals on an optical fiber for use at a subscriber's premises in a telecommunications network.

It has been proposed to use optical fibers for connecting subscribers to telecommunications networks, thereby expanding the range of services available to subscribers especially as a result of much larger bandwidths being available than are available using existing copper subscriber lines. However, optical fiber subscriber connections may involve higher costs. For example, an optical fiber interface for subscriber lines may require costly components such as a light source, a coupler and a receiver, in contrast to copper line interfaces which cost very little. It would be desirable to provide an optical fiber interface which uses fewer and less expensive components, and which also requires a minimum of setup.

In Ettenberg et al. U.S. Pat. No. 4,195,269 dated Mar. 25, 1980 and entitled "Two-Way Communication System", a two-way single fiber optical communication system is disclosed in which optical couplers at both ends of an optical fiber link are eliminated, and a light source is required at only one end of the link.

An object of the present invention is to provide an improved optical fiber interface.

In accordance with the present invention there is provided an optical fiber interface comprising: an optical fiber; means for continuously monitoring modulated light carried in a first direction by the fiber; and means responsive to an electrical signal for effecting relative movement between the fiber and the monitoring means to modulate reflected light carried in a second direction, opposite to the first direction, by the fiber.

In an embodiment of the present invention the means for movement effects a displacement of the fiber directed parallel to a longitudinal axis of the fiber.

In another embodiment of the present invention the means for movement effects a displacement of the monitoring means directed parallel to a longitudinal axis of the fiber.

In a third embodiment of the present invention the means for movement effects a displacement of the fiber directed perpendicular to a longitudinal axis of the fiber.

In a fourth embodiment of the present invention the means for movement effects a displacement of the monitoring means directed perpendicular to a longitudinal axis of the fiber.

The present invention will be further understood from the following description with reference to the drawings, in which:

FIGS. 1 to 4 schematically Illustrate different embodiments of the present invention.

Similar references are used in different figures to denote similar components.

Referring to FIG. 1, an optical fiber interface is shown which includes a first optical fiber 10, a second short optical fiber 12 aligned with and spaced from the first fiber 10 at a first end and coupled at a second end to an optical signal detector 14 having an electrical signal output 18, and a piezo electric transducer 16, having an electrical signal input 20. The optical fiber 12 is attached adjacent its first end to an upper surface of the piezo electric transducer 16, which is responsive to a signal supplied to its input 20 to move the fiber 12 in the direction of an arrow 28, that is perpendicularly to the axis of the fiber 12, between the aligned position shown and a slightly offset or misaligned position.

In operation, an optical signal, typically modulated at a bit rate of 45 Mb/s or more, is supplied in a first direction, represented by an arrow 22, via the fiber 10. With the fiber 12 in the aligned position, this optical signal traverses a gap 30 between the aligned fibers 10 and 12 and is supplied via the fiber 12 to the detector 14, where it is detected to produce a corresponding electrical signal at output 18. A portion of the light reaching the detector is reflected by the detector and provides a returned optical signal in the fiber 12, represented by an arrow 24, which passes via the gap 30 to fiber 10, as represented by an arrow 26. A potential difference applied to the input 20 of the piezo electric transducer 16 causes a misalignment of fibers 10 and 12, the degree of misalignment being dependent upon the amplitude of the potential difference and serving to control the amount of the reflected light which reaches and is returned by the fiber 10. A signal applied to the input 20 thus amplitude modulates a returned optical signal: such a modulation can have a frequency or bit rate which is one or more orders of magnitude smaller than the bit rate of the signal supplied in the direction 22 via the fiber 10.

Obviously, the fiber 10 could, instead of fiber 12, be attached to the piezo transducer 16, with similar results. In either case, however, there is a disadvantage in that the amount of the supplied optical signal reaching the detector 14 is also affected by the fiber misalignment. In other words, the modulation depth of the returned signal is only enhanced at the expense of higher insertion loss of the interface.

Figure 2:
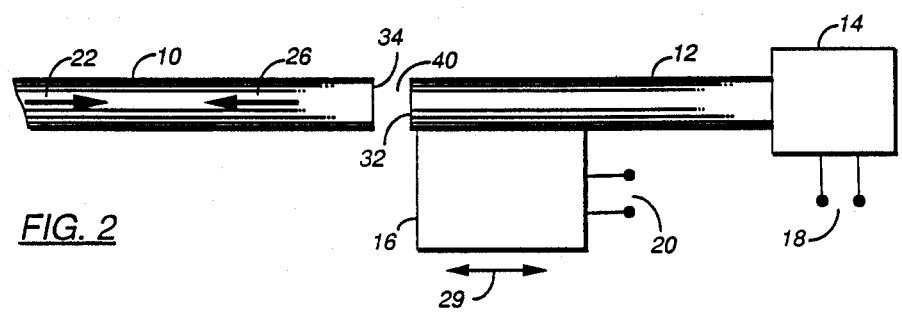

This disadvantage is reduced by the alternative arrangement shown in FIG. 2, in which the transducer 16 is responsive to a signal applied to its input 20 to move fiber 12 in a direction 29 parallel to the aligned axes of the fibers 10 and 12, thereby to vary the width of a Fabry-Perot gap 40 between the fibers.

In a first position, light reflected at the first end 34 of the fiber 10 and light reflected at an adjacent end 32 of the fiber 12 are in phase and add together to produce a returned optical signal in the direction 26. In a second position, the light reflections from the two ends 32 and 34 are 180 degrees out of phase and cancel each other to produce substantially no returned optical signal. Hence, the Fabry-Perot gap 40 between the ends 32 and 34 is varied by the electrical signal applied to the input 20 to effect modulation of the amplitude of the returned optical signal.

For uncoated glass-air interfaces at the ends 32 and 34 each light reflection is about 4%, so that the total return signal level is about 8% of the amplitude of the optical signal supplied in the direction 22. As in the case of FIG. 1, the transducer 16 can instead be arranged to move the fiber 10.

Figure 3:
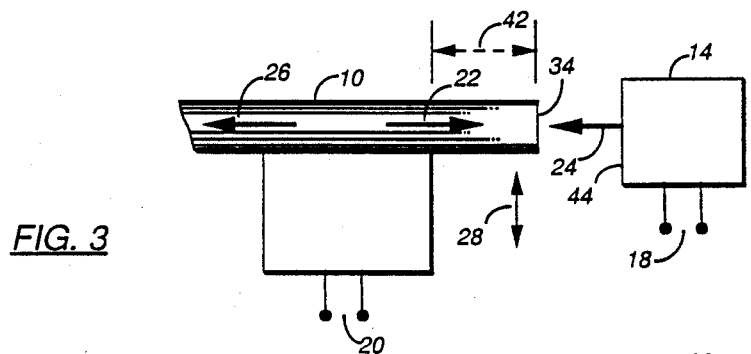

The disadvantage of enhancing modulation depth at the expense of higher insertion loss of the interface is also reduced in a third embodiment of the present invention as shown in FIG. 3, in which an optical fiber 10 is attached to an upper surface of a transducer 16, such that the end 34 of the fiber extends beyond an edge of the transducer to form a cantilever of length 42. The optical fiber 10 is set up with its axis perpendicular to a surface 44 of the detector 14 and approximately aligned with the center of the detector surface 44.

In a first position light is reflected from the detector surface 44 and provides a returned optical signal, in a direction 24, which enters fiber 10 in a direction 26. Movement of the fiber in a direction 28 causes both a displacement and flexing of the cantilevered end of the fiber 10 such that at a second position, the end of the fiber 10 is flexed to a sufficient degree to prevent light entering the fiber 10 thereby to produce substantially no returned optical signal 24. Hence, the position of the fiber is varied by an electrical signal applied to the input 20 to effect modulation of the amplitude of the returned optical signal.

Figure 4:
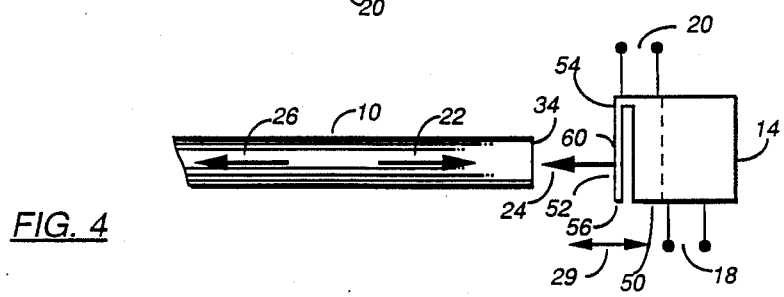

A fourth embodiment of the present invention provides a further reduction in the number of components and setup requirements. As shown in FIG. 4, the transducer 16 of the previous embodiments is replaced by a transducer 50, comprising a beam 52 cantilevered by attachment at an end 54 to the face 58 of detector 14, and having input 20. The transducer 50 uses an upper semiconductor layer of detector 14 for one of its input terminations as denoted by broken line in FIG. 4. The axis of fiber 10 is aligned to be perpendicular to and approximately centered with the surface 60 of beam 52.

When no voltage is applied to input 20, the beam 52 remains approximately parallel to the face 58 of detector 14. The application of a voltage to input 20 produces an electrostatic force between the beam 52 and the face 58 causing an angular displacement of beam 52. With the beam 52 in a first position, light reflected at the surface 60 enters the fiber 10 via the fiber end 34 to produce a returned optical signal in a direction 26. In a second position an end 56 of the beam 52 is displaced such that the light is reflected away from the fiber end 34 to produce substantially no returned optical signal. Hence, the relative angle between the axis of fiber 10 and the face 60 of beam 52 is varied by the electrical signal applied to the input 20 to effect modulation of the amplitude of the returned optical signal.

Although a piezo device has been described in three of the specific embodiments of the present invention, a suitable electromechanical device having the required frequency response, can be substituted.

The present invention provides an optical fiber interface which uses a few inexpensive components and requires little setup.

Numerous modifications, variations and adaptations may be made to the particular embodiments of the invention described above without departing from the scope of the invention, which is defined in the claims.

What is claimed is:

1. An optical fiber interface, comprising:
   an optical fiber;
   means for continuously monitoring modulated light carried in a first direction by the fiber; and
   means responsive to an electrical signal for effecting relative movement between the fiber and the monitoring means to modulate reflected light carried in a second direction, opposite to the first direction, by the fiber.

2. An interface as claimed in claim 1 wherein the relative movement is directed parallel to a longitudinal axis of the fiber.

3. An interface as claimed in claim 1 wherein the relative movement is directed perpendicular to a longitudinal axis of the fiber.

4. An interface as claimed in claim 2 wherein the relative movement is effected by displacing the fiber.

5. An interface as claimed in claim 2 wherein the relative movement is effected by displacing the monitoring means.

6. An interface as claimed in claim 3 wherein the relative movement is effected by displacing the fiber.

7. An interface as claimed in claim 3 wherein the relative movement is effected by displacing the monitoring means.

8. An interface as claimed in claim 4 wherein the monitoring means comprises a second optical fiber and a detector means coupled thereto, the first and second optical fibers forming a Fabry-Perot gap, wherein the relative movement means is adapted for effecting a displacement of the first fiber for varying the Fabry-Perot gap.

9. An interface as claimed in claim 5 wherein the monitoring means comprises a second optical fiber and a detector means coupled thereto, the first and second optical fibers forming a Fabry-Perot gap, wherein the relative movement means is adapted for effecting a displacement of the first fiber for varying the Fabry-Perot gap.

10. An interface as claimed in claim 5 wherein the monitoring means comprises a detector and a beam member between the fiber and the detector, the beam member having a partially reflecting surface, wherein the relative movement means is adapted for effecting an angular displacement of the beam member between first and second positions, in which, respectively, first and second amounts of light reflecting from the surface of the beam member are incident upon an end surface of the fiber, the first amount of light being greater than the second amount.

11. An interface as claimed in claim 6 wherein the relative movement means is adapted for effecting an angular displacement of an end portion of the optical fiber between a first position in which a first amount of light reflecting from the surface of the monitoring means is incident upon the end surface of the optical fiber, and a second position in which a second amount of light reflecting from the surface of the monitoring means is incident upon the end surface of the optical fiber, the first amount of light being greater than the second amount.

12. An interface as claimed in claim 6 wherein the relative movement means is adapted for bending the optical fiber between a first position in which an amount of light carried in the fiber is attenuated, and a second position in which a greater amount of light carried in the fiber is attenuated.

13. An interface as claimed in claim 6 wherein the monitoring means comprises a second optical fiber and a detector means coupled thereto, wherein the relative movement means is adapted for effecting a displacement of the fiber between a first position in which an amount of light exiting one fiber enters the other fiber, and a second position in which a lesser amount of light exiting one fiber enters the other fiber.

14. An interface as claimed in claim 7 wherein the monitoring means comprises a second optical fiber and a detector means coupled thereto, wherein the relative movement means is adapted for effecting a displacement of the fiber between a first position in which an amount of light exiting one fiber enters the other fiber, and a second position in which a lesser amount of light exiting one fiber enters the other fiber.

15. An interface as claimed in claim 10 wherein the relative movement means comprises the beam member consisting essentially of semiconductor material attached at one of its ends to the detector thereby to form a cantilever.

16. An interface as claimed in claim 8 wherein the relative movement means comprises a piezo electric device.

17. An interface as claimed in claim 9 wherein the relative movement means comprises a piezo electric device.

18. An interface as claimed in claim 11 wherein the relative movement means comprises a piezo electric device.

19. An interface as claimed in claim 12 wherein the relative movement means comprises a piezo electric device.

20. An interface as claimed in claim 13 wherein the relative movement means comprises a piezo electric device.

21. An interface as claimed in claim 14 wherein the relative movement means comprises a piezo electric device.

* * * * *